(12) United States Patent
Mukai et al.

(10) Patent No.: US 6,387,304 B2
(45) Date of Patent: *May 14, 2002

(54) METHOD OF MANUFACTURING ARTIFICIAL MARBLE HAVING STRIPE PATTERN

(75) Inventors: Nobuhiro Mukai; Masaaki Shibazaki; Sotaro Sasano, all of Toyama (JP)

(73) Assignee: Du Pont-MRC Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/423,661

(22) PCT Filed: Mar. 29, 1999

(86) PCT No.: PCT/JP99/01579

§ 371 Date: Nov. 22, 1999

§ 102(e) Date: Nov. 22, 1999

(87) PCT Pub. No.: WO99/50041

PCT Pub. Date: Oct. 7, 1999

(30) Foreign Application Priority Data

Mar. 31, 1998 (JP) .......................... 10-086064
Apr. 7, 1998 (JP) .......................... 10-094516
Apr. 13, 1998 (JP) .......................... 10-101376

(51) Int. Cl.$^7$ .............................................. B29C 39/12

(52) U.S. Cl. .......................... 264/73; 264/74; 264/245; 427/280; 427/281; 425/130; 425/134; 425/449; 425/224

(58) Field of Search .............................. 264/73, 74, 245; 427/280, 281; 425/130, 134, 449, 224

(56) References Cited

U.S. PATENT DOCUMENTS

| 3,923,941 A | * 12/1975 | Weaver ........................ 264/73 |
| 4,710,333 A | * 12/1987 | Murakami et al. ............. 264/73 |
| 5,055,324 A | * 10/1991 | Stecker ........................ 427/281 |
| 5,698,032 A | * 12/1997 | Weis ........................... 118/402 |
| 5,837,175 A | 11/1998 | Mukai et al. .................. 264/73 |

FOREIGN PATENT DOCUMENTS

| JP | 57-6718 | 1/1982 | |
| JP | 57-087319 | * 5/1982 | .................. 264/73 |
| JP | 57-087913 | * 6/1982 | .................. 264/73 |
| JP | 1-317723 | 12/1989 | |
| JP | 4-201526 | 7/1992 | |
| JP | 7-196356 | 12/1993 | |
| JP | 7-88849 | 4/1995 | |
| JP | 10-128771 | 5/1998 | |
| JP | 10-323848 | 12/1998 | |

* cited by examiner

*Primary Examiner*—Suzanne E. McDowell
(74) *Attorney, Agent, or Firm*—Oblon, Spivak, McClelland, Maier & Neustadt, P.C.

(57) ABSTRACT

A method for producing artificial marble having a stripe pattern comprising injecting liquid resins having different colors into a molding cell so that they are laminated to form two or more layers; then moving a comb-like tool through the laminated liquid resins while allowing the teeth to contact the bottom surface of the molding cell, then curing the liquid resins to form artificial marble, wherein, the comb-like tool is allowed to move through the liquid resins while the interval between teeth of the comb-like tool is allowed to vary. Artificial marble can be produced having a natural marble-like appearance in which the interval of stripe varies in a natural fashion or having a radial cut moire stripe pattern.

12 Claims, 5 Drawing Sheets

METHOD OF MANUFACTURING ARTIFICIAL MARBLE HAVING STRIPE PATTERN

BACKGROUND OF THE INVENTION

1. Field of the Invention

The present invention relates to a method for producing artificial marble having a stripe pattern, and a continuous production apparatus thereof.

2. Description of the Related Art

Conventionally, artificial marble used in counters of wash stands, table tops and the like has been produced by curing a liquid resin. As a method for producing such artificial marble carrying patterns on the surface, Japanese Patent Application Publication (JP-B) No. 59-1568 and Japanese Patent Application Laid-Open (JP-A) No. 1317723 disclose a method in which a synthetic resin material of different colors is mixed by injecting a liquid resin into a molding cell.

However, according to these conventional methods, there are problems that reproducibility of pattern manifestation is deficient, and production yield for obtaining an excellent product is low. Further, when the product is used as artificial marble, the surface thereof is often shaved and therefore maintaining the surface pattern is required in this process. However, in many cases, the pattern disappears or changes significantly by shaving. Moreover, when an extraneous material is used for manifestation of a pattern, a difference in curing speed tends to occur and a difference in physical property between materials tends to occur. Consequently, the mechanical properties of the artificial marble may sometimes decrease as compared with that having no pattern.

The present inventors have suggested, as a method for solving the above-described problems, a method in which liquid resins having different colors are laminated in a molding cell, and comb-like tools are allowed to move in the molding cell before the resins are cured to produce artificial marble in JP-A No. 10-128771. According to this method, a stripe pattern having a clear appearance can be simply formed and control of this pattern is easy, and further, a pattern can also be formed continuously along with thickness direction.

However, the visual feeling is flat and a simple pattern is liable to be formed according to this method; therefore, the resulting artificial marble is not fully satisfactory from the standpoint of appearance as compared with natural wood materials and natural marble. Particularly, there is room for improvement in view of delicacy of the hue, depth, texture and a luxurious feeling present in natural substances such as natural wood, natural stone and the like.

Therefore, in JP-A No. 10-32384, a method is suggested in which a liquid resin containing a nonuniformly dispersed coloring agent is injected in the lowest layer of a molding cell and a comb-like tool is allowed to move in the molding cell, and production of artificial marble having a radial cut wood pattern with a delicate hue and natural appearance contained in wood or having a natural marble-like stripe pattern excellent in texture and deep feeling is made possible.

SUMMARY OF THE INVENTION

An object of the present invention is to provide a method for producing artificial marble wherein a pattern in which an interval of stripes varies in a more natural-like fashion can be formed and control of this pattern is easy.

Another object of the present invention is to provide a production method which can form artificial marble having a stripe pattern so that control of the pattern is easy and a more natural-like bleeding or diffusion is present at the boundary of the pattern.

Still another object of the present invention is to provide a method for producing artificial marble which can obtain a stripe pattern which can be formed continuously along the thickness direction and does not disappear even if the surface is shaved.

Further another object of the present invention is to provide a production apparatus for continuously carrying out industrial scale production of artificial marble having such a stripe pattern.

Namely, the present invention provides a method for producing artificial marble having a stripe pattern, comprising injecting liquid resins having different colors into a molding cell so that they are laminated to form two or more layers, then moving a comb-like tool through the laminated liquid resins while allowing the teeth to contact the bottom surface of the molding cell, then curing the liquid resins to form artificial marble, wherein the comb-like tool is allowed to move through the liquid resins while the interval between teeth of the comb-like tool is allowed to vary.

This method can be carried out by using a tool wherein the handle and teeth are connected via a soft member. Also, this method can be conducted by using a plurality of comb-like tools and allowing the comb-like tools to move through liquid resins while allowing the interval between teeth in the group of the comb-like tools to relatively vary.

Further, another aspect of the present invention is a method for producing artificial marble having a stripe pattern, comprising injecting liquid resins having different colors into a molding cell so that they are laminated to form two or more layers, then moving a comb-like tool through the laminated liquid resins while allowing the teeth to contact the bottom surface of the molding cell, then curing the liquid resins to form artificial marble, wherein the comb-like tool is allowed to move while allowing a bleeding forming means to contact the bottom surface of the molding cell following the track of the teeth of the comb-like tool.

As the above-described bleeding forming means, a member having a thickness and a weight to be buried into liquid resins can be used.

Furthermore, the present invention provides an apparatus for continuously producing artificial marble, comprising a molding cell which moves, a liquid resin supplying means for laminating liquid resins having different colors to form two or more layers on the molding cell, and a comb-like tool placed so that the teeth thereof are in contact with the bottom surface of the molding cell, wherein the liquid resin supplying means has a plurality of resin discharging ports, and at resin discharging ports for resins other than the lowest layer liquid resin, distributing plates are placed so that a liquid resin flows mainly to the cell moving direction and vertical direction thereof, and flowing to the reverse direction of the cell moving direction is prevented, and a non-stirring type mixer which mixes a liquid resin and a coloring agent is placed upstream of at least one resin discharging port.

In this production apparatus, a straightening plate can be further placed for imparting a constant flow directional property to the flow pattern of a liquid resin at the bottom surface of the molding cell, upstream of the liquid resin supplying means. As the above-described distributing plate, that having the combined shape of a shielding plate extending to vertical direction and a dividing plate inclined in the form of a semi-cone can be used.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
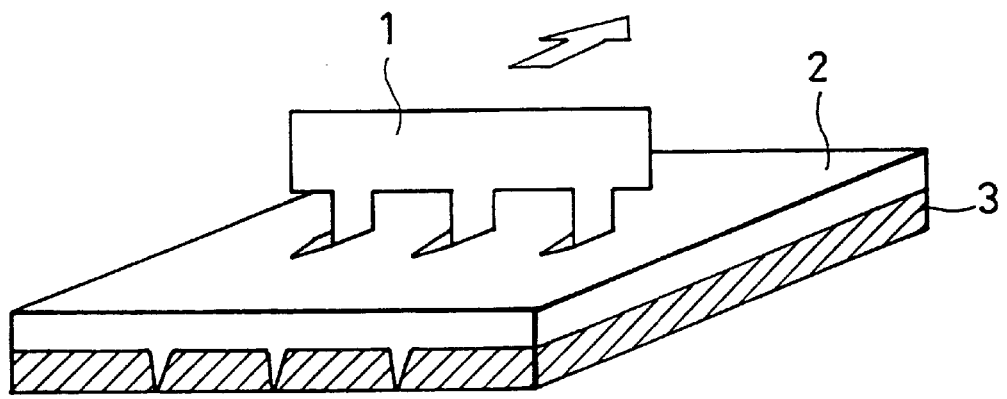
FIG. 1 is a schematic view illustrating a production method of the present invention.

Referring now to the drawings, wherein like reference numerals designate identical or corresponding parts throughout the several views.

In a method for producing artificial marble of the present invention, liquid resins which are raw materials of artificial marble are first injected into a molding cell. In this procedure, injection is so conducted that liquid resins having different colors are laminated. The injected liquid resin in the lowest layer 3 is a resin revealing base tone at a significant surface of a product. For laminating liquid resins, a method in which one liquid resin is injected into a molding cell and allowed to stand still, then another liquid resin 2 is injected onto it so as not to disturb the interface. In the present invention, at least two kinds of liquid resins having different colors are used. Therefore, three or more liquid resins having different colors may be laminated to form three or more layers.

It is preferable that liquid resins are uniformly laminated at an entire surface in a molding cell for controlling the manifestation of a pattern, however partial unevenness in the laminated thickness does not exert an influence directly on the manifestation of the stripe pattern. The thickness of the liquid resin lamination is not particularly restricted, and it is preferable that the thickness of each layer is from 2 to 20 mm. Particularly, too large a thickness of the lower layer liquid resin is not preferable, because it then becomes difficult for an upper layer liquid resin to reach the bottom surface of a molding cell. On the other hand, too small a thickness of a lower layer liquid resin is not preferable because the pattern then tends to go out of order and control thereof is difficult, and problems regarding use also occur, such as restriction of the shaving thickness of the resulting product, and the like.

Liquid resins used in the present invention are usually in mixed state, and the composition thereof is not particularly restricted. As typical examples thereof, there is exemplified a composition comprising a syrup which is a mixture of a monomer such as methacrylate and the like with a polymer thereof, a filler, a coloring pigment and a curing catalyst. Examples of the filler include inorganic fillers such as aluminum hydroxide, magnesium hydroxide, calcium hydroxide and the like, and organic fillers such as a wood flour and the like. Examples of the coloring pigment include titanium oxide, zinc sulfide revealing white color; iron oxide yellow revealing yellow color; iron oxide black revealing black color; iron oxide red revealing red color; ultramarine blue, phthalocyanine blue revealing blue color, and the like. Examples of the curing catalyst include tertiary butyl peroxymaleic acid, benzoyl peroxide, cumene hydroperoxide, tertiary butyl hydroperoxide, lauroyl peroxide, azobisisobutyronitrile and the like. In addition to these components, there can be added various components conventionally known as addition components for artificial marble, for example, dyes, ultraviolet absorbers, flame retardants, releasing agents, fluidizing agents, thickening agents, polymerization inhibitors, antioxidants and the like.

The viscosity of the liquid resin is preferably in the range from 300 to 5000 cp. When the viscosity is too high or too low, manifestation of a stripe pattern and control thereof tend to become difficult. Further, by selecting appropriately the viscosity of the liquid resin, precipitation of an additive such as filler, coloring agent and the like can be prevented.

Also in the method of the present invention, there can be used, as a liquid resins to be first injected into a molding cell, a liquid resin containing a non-uniformly dispersed coloring agent suggested in JP-A No. 10-323848. The liquid resin containing a non-uniformly dispersed coloring agent herein referred to means both a resin wherein one coloring agent is dispersed in a liquid resin and there is unevenness in coloring concentration of a liquid resin due to non-uniform dispersion thereof, and a resin in which two or more coloring agents are dispersed in a liquid resin and there is unevenness also in hue of a liquid resin due to non-uniform dispersion of these coloring agents, and a resin including both of them. When such a liquid resin containing a non-uniformly dispersed coloring agent is used, commonness of visual feeling disappears from the resulting artificial marble and one having an extremely improved grade and a natural appearance is obtained. Also regarding a liquid resin laminated as an upper layer, a liquid resin containing a non-uniformly dispersed coloring agent can be used.

In the present invention, a comb-like tool is allowed to move through liquid resins thus injected into a molding cell to form layers while the leading end of the teeth are allowed to contact the bottom surface of the molding cell, so that the tool combs the laminated liquid resins. When the comb-like tools is allowed to move through liquid resins, expressed exaggeratedly, a concaveness from which a liquid resin is pushed away is formed in track of the teeth of the comb-like tool, and an upper layer liquid resin having different color flows in the concave. Therefore, an upper layer liquid resin having different color invades to the bottom surface of a molding cell in the track of the tooth of the comb-like tool, and a stripe pattern is formed in the track of the teeth of the comb-like tool when the bottom surface is a significant surface.

In the method of the present invention, it is necessary that an upper layer liquid resin flows into the track of the teeth of the comb-like tool, and if only a lower layer liquid resin flows into that area, a stripe pattern is not formed. Therefore, it is necessary that a concaveness is formed in the track of the teeth. Since various factors such as the viscosity of a liquid resin, the moving speed of a comb-like tool, the shape of a comb-like tool and the like are related mutually, conditions for successful occurrence of this concaveness cannot be determined commonly. FIG. 1 shows this situation schematically.

In the first method of the present invention, when a comb-like tool is allowed to move through the liquid resins, the movement is conducted while the interval between teeth of the comb-like tool is allowed to change. By change of the interval between teeth, a stripe pattern as the track of the teeth fluctuates, and artificial marble having a more nature-like feeling can be obtained.

There are several specific means for changing the interval between teeth of a comb-like tool and moving the tool, and the first embodiment is a method in which a tool comprising a handle and teeth connected via a soft member is used.

Namely, a tool is used in which a handle 4 and teeth 5 of a comb-like tool 1 are not connected directly but connected via soft connecting members 6. When such a comb-like tool is used and teeth thereof are allowed to move through liquid resins, positions of respective teeth in the liquid resins slightly change due to resistances received by the teeth from the liquid resins, therefore, the interval between the teeth will slightly change. The width of stripe also changes since force exerted by the leading end of the teeth onto the bottom surface of the cell changes, too. Particularly, when a comb-like tool is allowed to snake slightly through liquid resins, these changes are amplified, and a pattern is obtained having a natural feeling fluctuation and having changes in the width and interval of stripes.

As a soft connecting member for connecting a handle and tooth, any member can be used, provided that movement of the teeth does not completely follow the movement of the handle of the comb-like tool, and the member has appropriate durability. Examples of connecting means manifesting no restoring force are thread, string, chain and film, and an elastic connecting means having restoring force may be a spring.

In this case, with respect to teeth part, since it is required that the leading end of the teeth part is in contact with the bottom surface of a cell in moving a comb-like tool, if the contact is difficult, it is preferable that a suitable weight 7 and the like are fitted so that the leading end of the teeth does not separate from the bottom surface.

The second embodiment for allowing a comb-like tool to move while the interval between teeth of the tool is allowed to change is a method in which a plurality of comb-like tools are used and the comb-like tools are allowed to move through liquid resins while allowing the interval between teeth in the group of the comb-like tools to relatively change. Namely, it is a method in which by allowing a plurality of comb-like tools to move while positional relation thereof is allowed to change, the distance between teeth in whole these comb-like tools, particularly the distance between teeth regarding the direction vertical to moving direction of the comb-like tool is allowed to change when the tools are allowed to move through liquid resins.

In this case, these comb-like tools may be moved manually, or may also be allowed to move by an automatic control means according to previously programmed fluctuation movement.

The moving speed of the teeth of a comb-like tool is important in the relation with the viscosity of a liquid resin. When the moving speed of the teeth is too slow, no concaveness is formed in the track of the tooth, therefore, an upper layer liquid resin having different color cannot reach the bottom surface of a molding cell and a stripe pattern cannot be formed. The moving speed of a comb-like tool is preferably from 1 to 10 cm/sec, in general. A comb-like tool may be allowed to move straight, but it is preferable that it is allowed to move while slightly snaked. Particularly, in the case of the second embodiment using a plurality of comb-like tools, the interval between teeth in the group of comb-like tools cannot be varied unless at least a part of comb-like tools is allowed to snake.

In a comb-like tool used in the present invention, it is suitable that the teeth are made of a material which is inactive against liquid resins and exhibits no adhesion, and examples of this material include metals such as aluminum and the like, organic materials coated with polytetrafluoroethylene, and the like.

Figure 3:
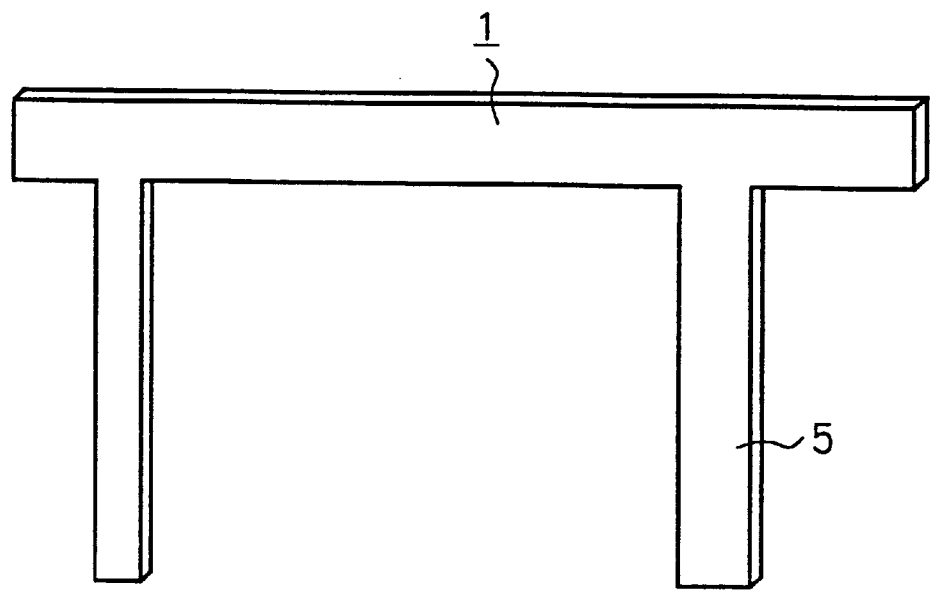

FIG. 3 is a schematic view of a comb-like tool used in the first method of the present invention, particularly in the second embodiment. Regarding the shape of the tooth of a comb-like tool, it is suitable that the length of the tooth is fully longer than the thickness of laminated liquid resins so as not to cause unnecessary disturbance in an upper layer liquid resin. The width of the tooth (length vertical to moving direction of a tooth) is preferably from 1 to 20 mm. The width of the tooth exerts an influence on the width of the stripe formed, though it does not coincide with the width of the stripe formed. The thickness of a tooth (length along moving direction of a tooth) may advantageously be a thickness at which mechanical strength of the tooth is kept, and does not exert an influence on formation of a stripe pattern so much. Regarding the sectional shape of the tooth, a streamline shape is not suitable, and rectangle form is suitable such that turbulence occurs in a liquid resin in the track of the teeth. The shape of the leading end of the teeth preferably has a flat surface so as to enable close contact with the bottom surface of a molding cell. Regarding a comb-like tool used in the second embodiment, the number of teeth may also be one, and suitable number of teeth and suitable interval between teeth can be selected according to a stripe pattern desired.

After a comb-like tool is thus allowed to move while changing the interval between teeth, a liquid resin is cured according to an ordinary method, a cured product is taken out from a molding cell after curing to obtain artificial marble. The resulting artificial marble has a stripe pattern formed on the contact surface with the bottom surface of a molding cell. The thus formed stripe pattern is constituted of lines having a fluctuation unlike lines drawn with a ruler, because this stripe pattern is made based on flow mixing of liquid resins having different colors. Further, artificial marble having a radial cut-like moire pattern can also be produced when the tone of a liquid resin and the number of comb-like tools and the interval between teeth are suitably selected.

In the second method of the present invention, liquid resins having different colors are first injected into a molding cell so as to form two or more layers like in the case of the first method. Then, a comb-like tool is allowed to move through the laminated liquid resins while teeth thereof are allowed to contact the bottom surface of a molding cell, this comb-like tool may be allowed to move while changing the interval between teeth as in the case of the first method, or one comb-like tool may be allowed to move as it is. In this second method, a comb-like tool is allowed to move while allowing a bleeding forming means to contact the bottom surface of the molding cell following track of the teeth of the comb-like tool, in this operation. An upper layer liquid resin flows into lower layer part at the track of the teeth as described above, consequently, a part of an upper layer liquid resin reaches to the bottom surface of a molding cell from an orderly laminated condition of two or several-layered liquid resins, and changes occur in which spout-like disorder is formed when viewed in cross section, and this is recognized as a stripe pattern on a significant surface. When a bleeding forming means is further passed through this spout-like disorder part, liquid resins in this passing partare mixed and stirred, or shaved, and this is observed as delicate bleeding or disappearance at the interface of the stripe pattern on a significant surface.

As the bleeding forming means used in the second method of the present invention, there can be used, as apparent from the above description, one which does not significantly change mixed condition of liquid resins manifesting a stripe pattern at the track of the teeth but mixes mildly the interface part of the disorder, and which has the function to allow this condition to be manifested as bleeding, gradation or disappearance at the boundary of stripe on a significant surface.

Figure 4:
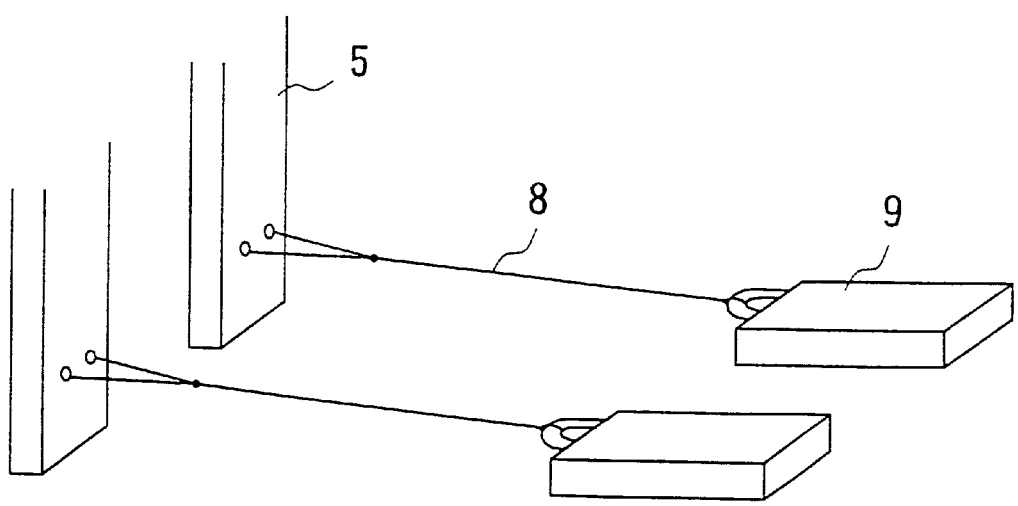
FIG. 4 is a view showing combined condition of a comb-like tool and a bleeding forming means used in a production method of the present invention.
Figure 5:
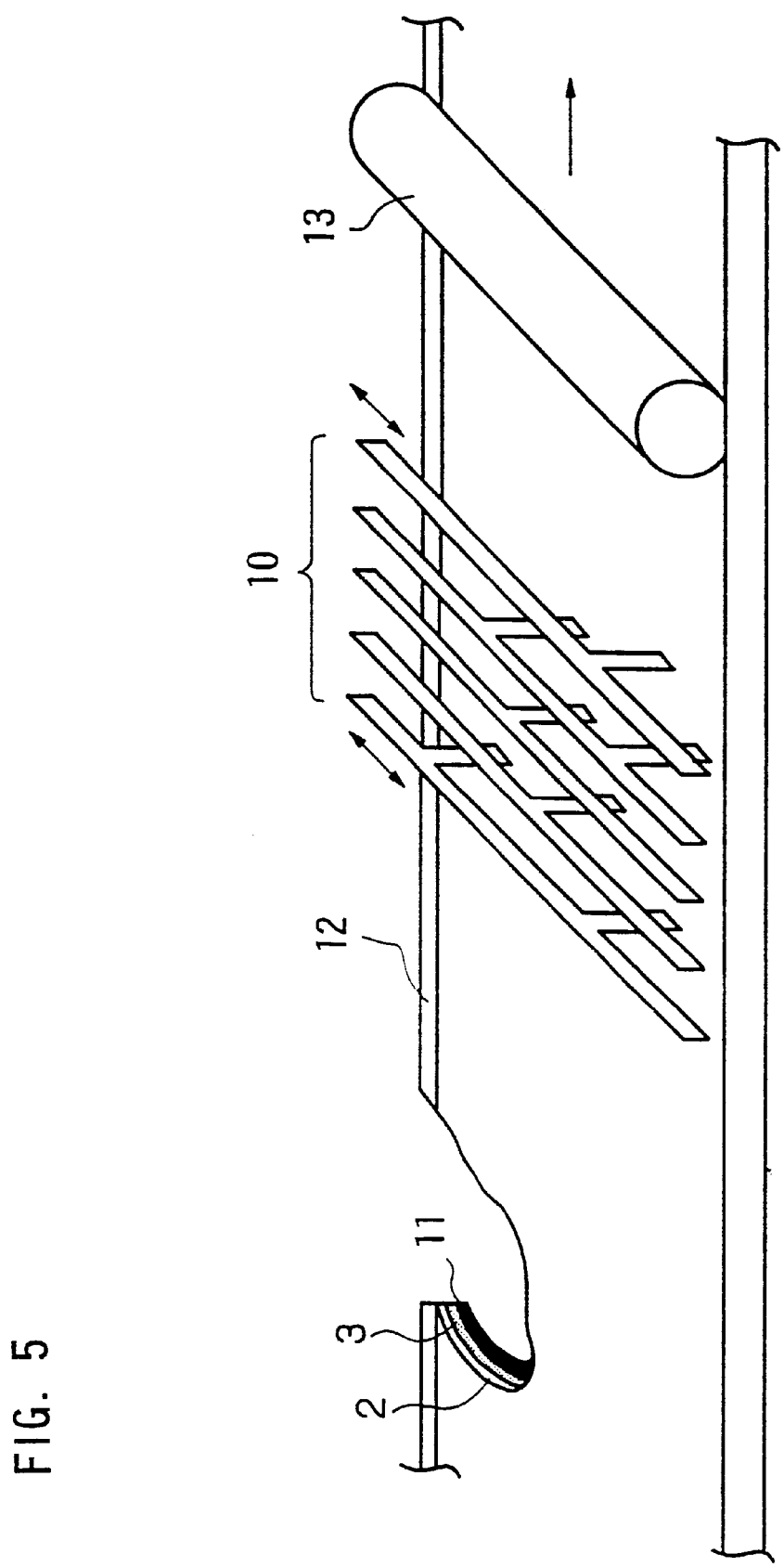
FIG. 5 is a partially cut schematic view showing an example for continuously carrying out a production method of the present invention.

As one specific example of this bleeding forming means, a plate 9 which is connected via a thread 8 to a tooth 5 of a comb-like tool is shown in FIG. 4. The specific gravity of this plate is preferably significantly larger than that of a liquid resin, and a plate having such specific gravity tends to sink into a liquid resin and a resin around a significant surface is allowed to move more effectively. Further, the thickness of a plate is preferably such that it is completely buried in a liquid resin, and it is particularly preferably two-third or less of the laminated thickness of liquid resins. When a plate having such thickness is used, there occurs no such disorder that a depression is formed on the surface of a liquid resin even when the plate moves, and therefore the boundary part of stripe pattern is mixed mildly. From the standpoint of production of artificial marble having uniform thickness, it is preferable that the thickness of a plate is smaller than the laminated thickness of liquid resins. The width of a plate is preferably about the same as the width of a tooth of a comb-like tool from the standpoint of formation of suitable bleeding and the like. Though a rectangular plate is used in this case, a circular plate can be used, and there is no restriction on its shape.

A plate is connected via a thread so that the movement of the plate does not follow completely coincidently to the movement of a tooth of a comb-like tool due to connection of a thread which does not produce restoration force against the plate. By this, the extents of bleeding and gradation change delicately depending on position, and more natural bleeding and the like are formed. Particularly, when a tooth of a comb-like tool is allowed to snake, this effect is manifested more clearly. It is preferable that the length of a thread as a connecting means is appropriately selected from this point of view. Connection of a comb-like tool and a bleeding means is for simplification of the production process, and these may be, of course, allowed to move independently.

Also regarding a bleeding forming means, it is important that it is allowed to move while contacting the bottom surface of a cell. If it is allowed to move when it is apart from the bottom surface of a cell, it is difficult for bleeding and gradation to be manifested on a significant surface.

After a comb-like tool and a bleeding forming means are thus allowed to move, liquid resins are cured to obtain artificial marble. The stripe pattern of the artificial marble obtained in this method is a stripe pattern having natural bleeding, gradation or delicate fluctuation, since it is formed by flow mixing of liquid resins having different colors and subsequent mild mixing and stirring.

Practice of the method of the present invention in a batch-wise casting method has been illustrated above, however, in a continuous casting method, a stainless belt 11 is used which is moving as a molding cell, and frame 12 for damming liquid resins made of rubber, resin and the like is placed on both sides. Therefore, in this case, the method of the present invention can be carried out by allowing a comb-like tool to move while fluctuating relatively against liquid resins by preventing movement of comb-like tools group 10 along the moving direction of the stainless belt 11 and by allowing the comb-like tools group 10 to move mildly to and from along the vertical direction to the belt moving direction, as shown in FIG. 4.

Figure 6:
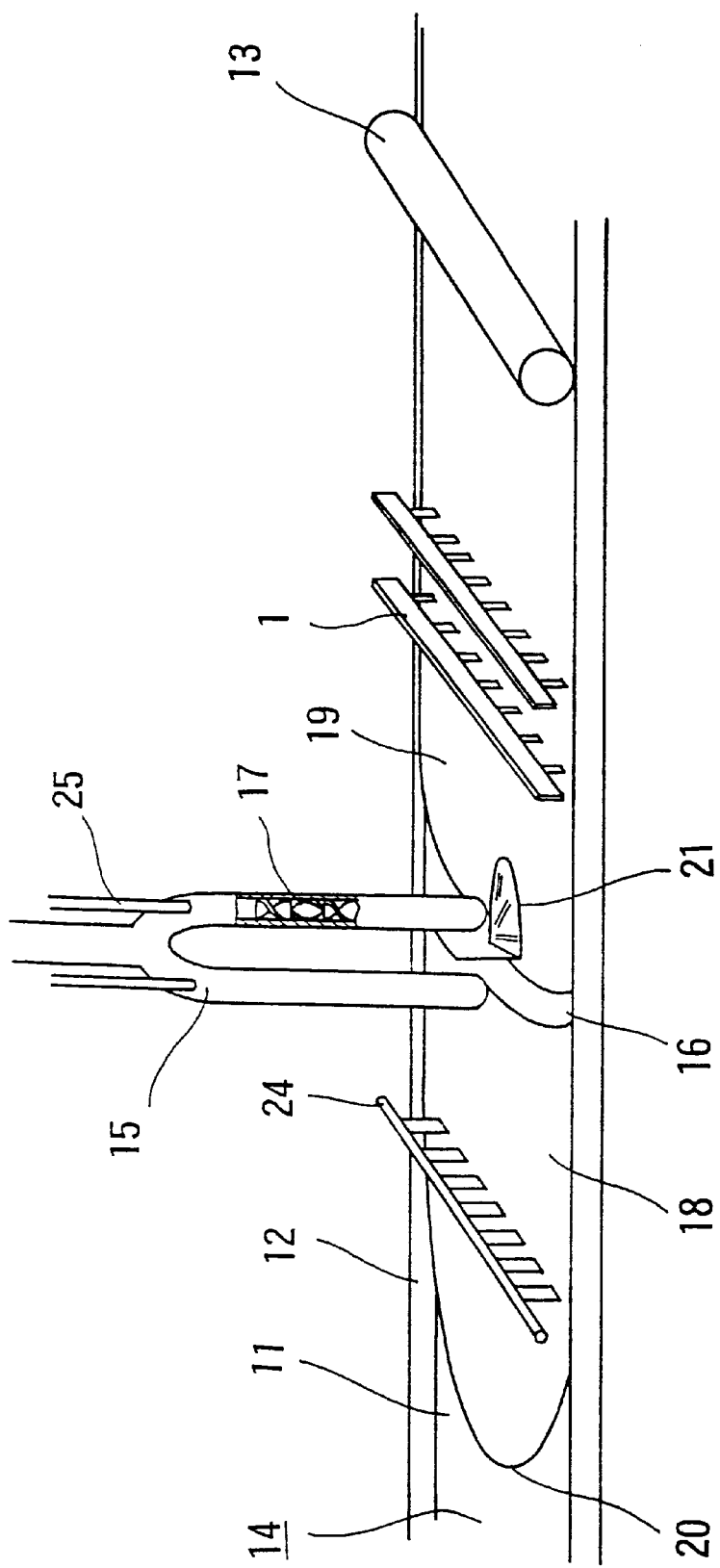
FIG. 6 is a schematic view showing an apparatus for continuously producing artificial marble of the present invention.

Then, an apparatus for continuously producing artificial marble of the present invention will be illustrated referring to drawings. The apparatus of the present invention is basically constituted of a molding cell 14 which moves, a liquid resin supplying means 15 and a comb-like tool 1, as shown in FIG. 6.

The liquid resin supplying means 15 supplies a liquid resin onto the molding cell 14, and has a plurality of resin discharging ports 16 since it is necessary to laminate liquid resins having different colors to form at least two or more layers, in the present invention. Liquid resins discharged through the resin discharging ports can be introduced respectively through separate pipes 25 from respective liquid resin tanks, however, in the apparatus of the present invention, a liquid resin which is used as a base is introduced to near a molding cell through a pipe extending from one liquid resin tank, separated into a plurality of pipes corresponding to the number of liquid resins having different colors near the resin discharging ports and coloring agents are respectively mixed with respective resins. By this, the kinds and amounts of coloring agents can be changed simply.

As a mixing means for these coloring agents, a non-stirring type mixer 17 is placed upstream of at least one resin discharging port of the liquid resin supplying means in the production apparatus of the present invention, and liquid resins having different colors herein mixed are discharged through respective resin supplying ports.

As the non-stirring type mixer used in the apparatus of the present invention, various static mixers used in inline type can be used. Particularly due to easiness of cleaning work, that in which a spirally twisted element alone can be detached from the body is preferable.

A liquid resin and a coloring agent may be mixed completely in the non-stirring type mixer. However, by reducing the number of elements in the mixer, it becomes possible to make the mixing insufficient and provide a liquid resin in which the above-described coloring agent is dispersed non-uniformly.

A liquid resin injected into the lowest layer of a molding cell reveals base color on a significant surface of a product, and in the present apparatus, the resin supplying ports of the liquid resin are placed on most upper flow side of a molding cell which moves. When the liquid resin is supplied from the liquid resin discharging port onto the moving molding cell, the liquid resin spreads on the molding cell, and also flows to the upstream direction resisting movement of the molding cell. When one resin discharging port is provided or when a plurality of adjacent resin discharging ports are provided, tip part 20 of sump in the form of a parabola is formed on upstream part of the molding cell due to balance of the moving speed of the molding cell and the amount supplied of a liquid resin. On the other hand, a liquid resin layer having approximately uniform thickness is formed downstream. After a liquid resin is thus laminated as the lowest layer, liquid resins to be laminated thereon can be laminated sequentially by supplying the resins so that they do not disturb lamination interface with the lower layer and the tip part of sump is situated downstream to a discharging port of the liquid resin of the lowest layer. However, in this case, positions of respective resin discharge ports have be significantly separated, and therefore a fairly excess length of a molding cell is required, or there is a tendency that curing of a lower layer liquid resin progresses before the liquid resin reaches a setting part of a comb-like tool.

Figure 7:
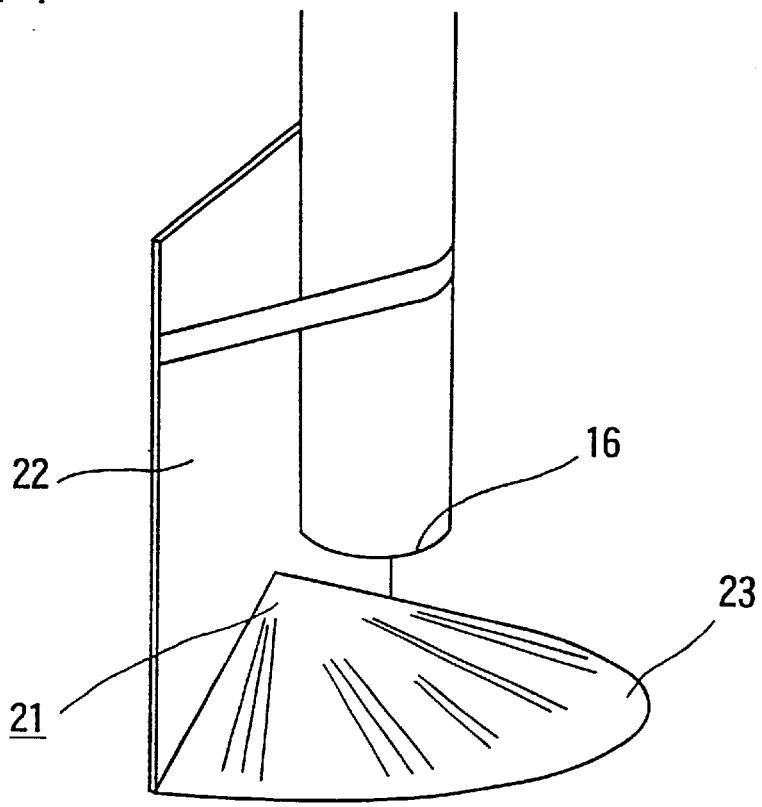
FIG. 7 is a view showing one example of a distributing plate used in this continuous production apparatus.

Therefore, in the present invention, distributing plates 21 as shown in FIG. 7 are placed at resin discharging ports other than the resin discharging port of the lowest liquid resin. The distributing plate prevents a liquid resin from flowing to the reverse direction to the movement of a cell, and allows upper layer liquid resins 19 to flow mainly to the moving direction of a cell and the vertical direction to the moving direction of a cell. In this manner, it is made possible that resin discharging ports for liquid resins having different colors are placed adjacently. This distributing plate can be constituted by combining, for example, a shielding plate 22 extending in the vertical direction and a dividing plate 23 for directing the flow of a liquid resin to the horizontal direction. In this example, a flat plate is used as the shielding plate 22, however, a bent plate can also be used. Further, a member obtained by dividing a conical inclined plate into halves may be used as the dividing plate 23, however, members of various forms such as a fan-shaped inclined plate and the like can also be used. It is preferable that the tip of the dividing plate is as near as possible the lamination height of a lower liquid resin. When this distance is large, the effect to place a dividing plate at a resin discharging port is not obtained easily.

In the apparatus of the present invention, the comb-like tool 1 is placed downstream of the liquid resin supplying means 15 while the leading end of its teeth contact the bottom surface (stainless belt) of a molding cell. When liquid resins laminated in a molding cell pass through setting part of this comb-like tool, the tool moves through the liquid resins so that it relatively combs the laminated liquid resins, and a stripe pattern is formed at the track of the teeth of the comb-like tool.

The moving speed of a molding cell is preferably from about 1 to 10 cm/s, in general. A comb-like tool may be allowed to stand still completely and allowed to move relatively linearly against a molding cell, or it can be allowed to move while snaking relatively against a molding cell by mild reciprocating movement along the vertical direction to the moving direction of a molding cell. From the standpoint of formation of a natural stripe pattern, the latter is more preferable.

Figure 2:
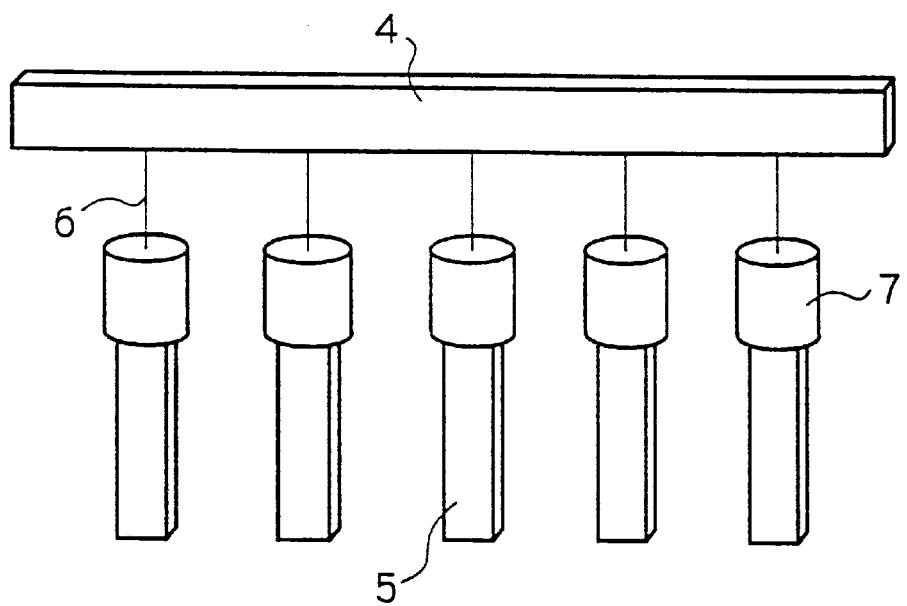
FIGS. 2, 3 and 8 are views showing examples of a comb-like tool used in a production method used in the present invention.
Figure 8:
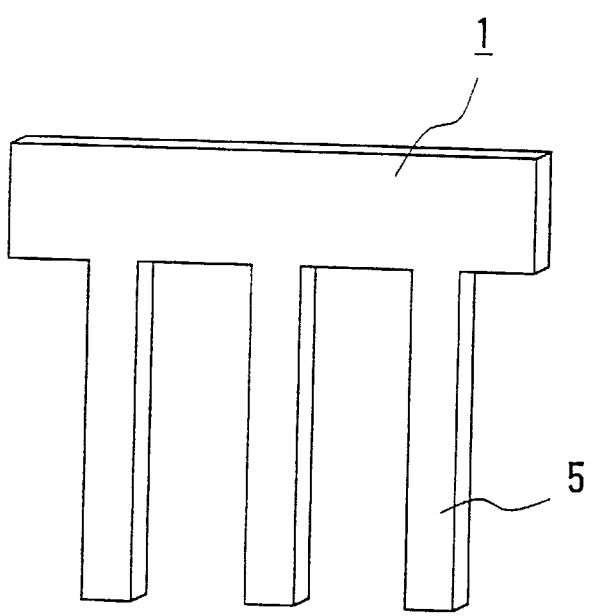

As the comb-like tool used in this continuous production apparatus, that in normal form as shown in FIG. 8 can be used, and those in which a bleeding forming means is connected as shown in FIG. 2 or FIG. 4 described previously, as well as other tools can also be used.

Thus, after passing through comb-like tool setting part, it is possible that the laminated thickness is controlled by pressing by a gauge roll if desired, then, liquid resins are allowed to be cured according to an ordinary method, cured resins are taken out from a molding cell to obtain artificial marble.

When a liquid resin in which a coloring agent is dispersed non-uniformly is used in the present apparatus, a track of resin flow tends to appear on a significant surface of a product owing to non-uniform distribution of the coloring agent. It is preferable that this flow pattern of a resin is endowed with a constant flow direction for obtaining a product having a natural appearance, and for this purpose, a straightening plate can be provided between the resin supplying port and the tip part 20 of sump. In the case of no object in this range, a liquid resin supplied from a resin discharging port flows reverse to this tip part of sump and reaches the bottom surface (significant surface) of a molding cell. However, there is almost no constant movement of a liquid resin at this tip part of sump, flow track of a resin may be formed in unnatural shape in some cases. The straightening plate plays a role in positively imparting constant direction to flow pattern of a liquid resin on this significant surface. The form of the straightening plate is not particularly restricted, and that having the same shape as the comb-like tool can be used, for example. Wherein, it is preferable to use a tool carrying teeth with somewhat wide size. Further, unlike the case of comb-like tool, the leading end of teeth may contact the bottom surface of a molding cell or may be slightly separate from the bottom surface providing the leading end is immersed into a liquid resin.

Artificial marble produced by the present invention can be applied to use such as kitchen top plates, washing dressing tables, bathtubs, tables, wall materials, furnitures, interior goods and the like in houses.

The present invention will be illustrated more specifically using examples. In the examples, "%" and "parts" indicate "% by weight" and "parts by weight", respectively.

EXAMPLE 1

One thousand parts of a methyl methacrylate syrup (hereinafter, abbreviated as syrup) composed of a mixture of 20% of polymethyl methcrylate and 80% of methyl methacrylate, 1630 parts of an aluminum hydroxide powder (BS-33, trade name, manufactured by Nippon Light Metal Co., Ltd.), 12 parts of ethylene glycol dimethcrylate, 20 parts of tertiary butyl peroxymaleic acid and 2 parts of deionized water were mixed, and stirred by a mixer to obtain a mixed slurry. This mixed slurry was de-foamed in a vacuum vessel, then, 0.1 part of glycol dimercapto acetate and 8 parts of a slurry prepared by dispersing calcium hydroxide in an amount of 25% into a syrup were added to prepared a base mixture. The viscosity of this base mixture was 1000 cps.

Two-third of this base mixture was taken aside and this was further divided into three portions, and coloring agent compositions No. 1 to 3 described in Table 1 (unit is by weight) were added to the three portions, respectively, and mixtures were stirred to uniform condition. Then, the resulted three kinds of colored mixtures were transferred to a pan-like vessel, and mixed moderately with a stirring rod for 3 seconds so that they were not mixed completely to prepare an incomplete mixture, and this was injected into a mold of 1000×2000 mm to obtain a thickness of 9 mm.

On the other hand, a coloring agent composition No. 4 was added to the remaining base mixture and mixed uniformly, and this mixture was injected onto the incomplete mixture in the mold to laminate a mixture layer having a thickness of 4.5 mm.

A comb-like tool having a foam shown in FIG. 2 was prepared in which 30 of teeth made of polytetrafluoroethylene of a length 120 mm, width 5 mm and thickness 3 mm carrying a lead weigh on its top were attached to a handle via strings having a length of 60 mm at irregular intervals of 10 to 30 mm. This comb-like tool was immersed into one end of the mold, and was allowed to move at a speed of 50 mm/s toward other end of the mold with slight snaking through the laminated mixtures while the teeth contacting the bottom surface of the mold. Then, this mold was covered with a cap and left for 30 minutes while heating to cure the resins, then, a cured article was taken out from the mold, to obtain artificial marble in which a moire pattern was manifested on the contact surface with the bottom surface of the mold.

Regarding the appearance of the resulted artificial marble, it had a stripe pattern like natural marble wherein the interval between moire pattern and width of the stripe were changed slightly. Even if the surface thereof was shaved about 0.5 mm, the basic stripe pattern did not change.

TABLE 1

| No. | Iron Oxide Yellow 50-580-570 manufactured by RBH | Iron Oxide Red 50-580-556 manufactured by RBH | Iron Oxide Black 50-580-557 manufactured by RBH | Titanium Oxide 50-580-548 manufactured by RBH | Syrup |
|---|---|---|---|---|---|
| 1 | 0.012 | 0.010 | 0.005 | 0 | 2.673 |
| 2 | 0.024 | 0.020 | 0.010 | 0 | 5.346 |
| 3 | 0 | 0 | 0 | 1.835 | 181.665 |
| 4 | 0.051 | 0.002 | 0.020 | 0 | 7.227 |
| 5 | 2.552 | 0.255 | 0.186 | 4.711 | 17.977 |
| 6 | 2.022 | 0.255 | 0.152 | 4.771 | 16.661 |
| 7 | 3.337 | 0.432 | 0.280 | 4.711 | 20.439 |
| 8 | 6.036 | 0.777 | 0.471 | 7.067 | 33.486 |

EXAMPLE 2

Artificial marble was obtained in the same manner as in Example 1 except that the coloring agent compositions 1 to 4 were changed to a coloring agent compositions 5 to 8, respectively. Regarding the appearance of the resulted artificial marble, it had a moire pattern like natural wood wherein the interval between moire pattern and width of the stripe were changed slightly, and even if the surface thereof was abraded about 0.5 mm, the basic moire pattern did not change.

EXAMPLE 3

A tool was made in which a bleeding forming means (5×15×20 mm) composed of a lead flat plate was connected via a string having a length of 35 mm as shown in FIG. 4 to the leading end of each tooth of a comb-like tool having form as shown in FIG. 8 made of a polytetrafluoroethylene plate having a thickness of 3 mm wherein the length of a tooth was 120 mm, the width of a tooth was 5 mm and the interval of teeth was 30 mm. This comb-like tool equipped with this bleeding forming means was immersed into one end of a mold wherein mixture layers were laminated in the same manner as in Example 1, and was allowed to move at a speed of 50 mm/s toward other end of the mold through the laminated mixes while the teeth and the lead flat plate contacting the bottom surface of the mold. Then, this mold was covered with a cap and left for 30 minutes while heating to cure the resins, then, a cured article was taken out from the mold, to obtain artificial marble in which a moire pattern was manifested on the contact surface with the bottom surface of the mold.

Regarding the appearance of the resulted artificial marble, it had a stripe pattern like natural marble wherein a part of boundary region between dark part and pale part had bleeding, gradation or slight change. Further, even if the surface thereof was shaved about 0.5 mm, the basic stripe pattern did not change.

EXAMPLE 4

The base mixture prepared in Example 1 was introduced into a liquid resin supplying means 15 of the apparatus for continuously producing artificial marble of the present invention shown in FIG. 6. This liquid resin supplying means has two-branched ends, and a static mixer 17 was plated on each end. The liquid resin was mixed with a coloring agent composition No. 9 described in Table 2 (unit is parts based on 100 parts of the base mixture) and the mixture was discharged as a lower layer liquid resin through a resin discharging port, and mixed with a coloring agent composition No. 10 and the mixture was discharged as an upper layer liquid resin through a resin discharging port 16 equipped with a distributing plate 21 having form shown in FIG. 7, onto a molding cell composed of a stainless belt 11 and rubber frames 12 placed on both side thereof. The stainless belt 11 moved at a speed of 46 mm/s, while the lower layer liquid resin flowed to part about 0.8 m upstream from the resin discharging port of the molding cell, and formed a tip part 20 of sump. On the other hand, the upper layer liquid resin scarcely flowed to upstream from the resin discharging port and was laminated on the upper layer. The lamination thickness of the liquid resin after constant condition had been accomplished was 7 mm both in the upper layer and the lower layer.

A straightening plate was placed on the intermediate part between the tip part of sump of the lower layer liquid resin and the resin discharging port of the lower layer liquid resin. The straightening plate was made by placing polytetrafluoroetylene plates having a length of 100 mm, a width of 30 mm and a thickness of 3 mm at an interval of about 150 mm, and the end of the plate was kept separated from the stainless belt. Further, two comb-like tools 2 of form in which polytetrafluoroethylene teeth having a length of 200 mm, a width of 5 mm and a thickness of 3 mm were placed at irregular intervals of 10 to 40 mm were placed 0.8 m downstream from the resin discharging port of the upper layer liquid resin so that the end of tooth contacted the stainless belt, and these comb-like tools were allowed to move gently to and fro each independently. The surface of the laminated mixture after passing through the setting part of the comb-like tool was pressed with a gauge roll 13 to make the thickness uniform, then, heated while moving to be cured for obtaining artificial marble.

Regarding the appearance of the resulting artificial marble, it had a stripe pattern like natural marble wherein a boundary region between dark part and pale part had slight change, and texture and deep feeling were excellent. Further, even if the surface thereof was abraded about 0.5 mm, the basic stripe pattern did not change.

TABLE 2

| No. | Titanium Oxide Paste 50-580-548 manufactured by RBH | Zinc Oxide Paste 50-580-573 manufactured by RBH | Syrup |
|---|---|---|---|
| 1 | 0 | 3.60 | 8.42 |
| 2 | 2.67 | 0 | 4.01 |

According to the production method of the present invention, artificial marble having a natural marble-looking stripe pattern excellent in texture and deep feeling or having delicate hue contained in wood and a natural-looking radial cut moire pattern can be formed by a simple process. Particularly, a product having an extremely natural-like appearance wherein the interval of the stripe is not uniform can be produced. Since this stripe pattern is formed continuously also in thickness direction of artificial marble, even if the surface of the artificial marble is shaved, the pattern does not disappear, and continuous stripe pattern can be manifested also on the shaved part. Further, the base part and the stripe pattern part of artificial marble have approximately the same composition, there is no decrease in the mechanical property of artificial marble by formation of pattern.

Also, according to the apparatus for continuously producing artificial marble of the present invention, artificial marble having a stripe pattern can be produced efficiently. Further, regarding a stripe pattern, those having natural marble-like appearance excellent in texture and deep feeling or having a radial cut moire pattern, and the like can be produced by slight change in conditions, and change in a hue of a liquid resin can be conducted easily.

Obviously, numerous modifications and variations of the present invention are possible in light of the above teachings. It is therefore to be understood that within the scope of the appended claims, the invention may be practiced otherwise than as specifically described herein.

What is claimed is:

1. A method for producing artificial marble having a stripe pattern, comprising injecting liquid resins having different colors into a molding cell so that they are laminated to form two or more layers, then moving a comb-like tool through the laminated liquid resins while allowing teeth of the tool to contact the bottom surface of the molding cell, then curing the liquid resins to form artificial marble, wherein, the comb-like tool is allowed to move through the liquid resins while an interval between teeth of the comb-like tool is allowed to vary, to produce a striped pattern formed from an upper layer liquid resin which flows to the bottom of the molding cell.

2. The production method according to claim 1 wherein a tool having a handle and teeth connected via a soft member is used as the-comb-like tool.

3. The production method according to claim 2, wherein a liquid resin in which a coloring agent is dispersed non-uniformly is injected into a lowest layer of the molding cell.

4. The production method according to claim 1 wherein a plurality of comb-like tools are used and allowed to move through liquid resins while allowing the interval between teeth in the plurality of the comb-like tools to vary relatively.

5. A method for producing artificial marble having stripe pattern, comprising injecting liquid resins having different colors into a molding cell so that they are laminated to form two or more layers, then moving a comb-like tool through the laminated liquid resins while allowing teeth of the tool to contact the bottom surface of the molding cell, then curing the liquid resins to form artificial marble, wherein, the comb-like tool is allowed to move while allowing a bleeding forming means moving therewith to contact a bottom surface of the molding cell following the track of the teeth of the comb-like tool.

6. The production method according to claim 5 wherein the bleeding forming means is a member having a thickness and a weight to be buried into the liquid resins.

7. The production method according to claim 6, wherein a liquid resin in which a coloring agent is dispersed non-uniformly is injected into a lowest layer of the molding cell.

8. The production method according to claim 5 wherein a liquid resin in which a coloring agent is dispersed non-uniformly is injected into the lowest layer of the molding cell.

9. An apparatus for continuously producing artificial marble, comprising a molding cell which moves, a liquid resin supplying means for laminating liquid resins having different colors to form two or more layers on the molding cell, and a comb-like tool placed so that teeth of the tool thereof are in contact with a bottom surface of the molding cell, wherein, the liquid resin supplying means has a plurality of resin discharging ports, and at resin discharging ports for resins other than the lowest layer liquid resin, distributing plates are placed so that a liquid resin flows mainly in a cell moving direction and a vertical direction thereto, and flowing to the reverse direction of the cell moving direction is prevented, and a non-stirring mixer which mixes a liquid resin and a coloring agent is placed upstream of at least one resin discharging port.

10. The continuous production apparatus according to claim 9, wherein said distributing plate has the combined shape of a shielding plate extending to a vertical direction and a dividing plate inclined in the form of a semi-cone.

11. The continuous production apparatus according to claim 10, wherein a straightening plate is placed upstream of the liquid resin supplying means, for imparting constant flow directional property to a flow pattern of a liquid resin at the bottom surface of the molding cell.

12. The continuous production apparatus according to claim 9, wherein a straightening plate is placed upstream of the liquid resin supplying means, for imparting constant flow directional property to a flow pattern of a liquid resin at the bottom surface of the molding cell.

* * * * *